Sept. 26, 1950          W. VUTZ          2,523,890
POWER LIFT MECHANISM FOR IMPLEMENTS
Filed Feb. 12, 1946                    5 Sheets-Sheet 1

INVENTOR.
WILHELM VUTZ
BY
F. L. Walker
ATTORNEY

Sept. 26, 1950 W. VUTZ 2,523,890
POWER LIFT MECHANISM FOR IMPLEMENTS
Filed Feb. 12, 1946 5 Sheets-Sheet 2

INVENTOR.
WILHELM VUTZ
BY J. C. Walker
ATTORNEY

Sept. 26, 1950 W. VUTZ 2,523,890
POWER LIFT MECHANISM FOR IMPLEMENTS
Filed Feb. 12, 1946 5 Sheets-Sheet 3
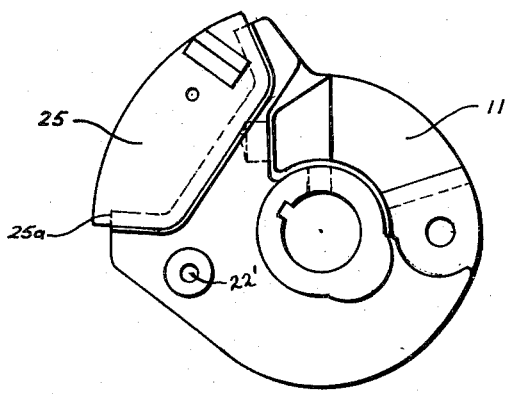
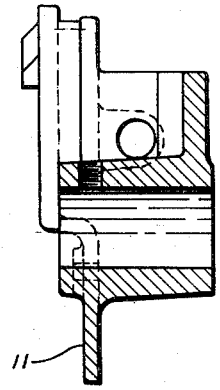
FIG. 5  FIG. 6
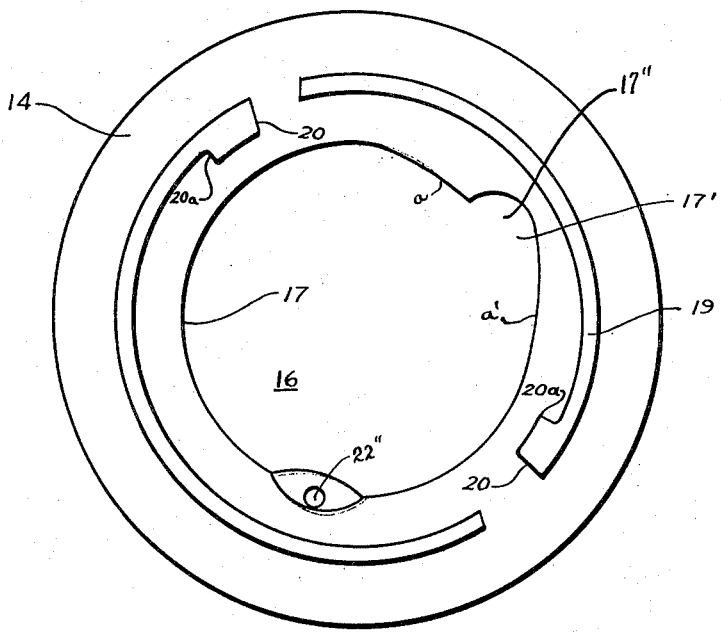
FIG. 7
INVENTOR.
WILHELM VUTZ
BY F. C. Walker
ATTORNEY Sept. 26, 1950 W. VUTZ 2,523,890
POWER LIFT MECHANISM FOR IMPLEMENTS
Filed Feb. 12, 1946 5 Sheets-Sheet 4

INVENTOR.
WILHELM VUTZ
BY J. L. Walker
ATTORNEY

Sept. 26, 1950 W. VUTZ 2,523,890
POWER LIFT MECHANISM FOR IMPLEMENTS
Filed Feb. 12, 1946 5 Sheets-Sheet 5
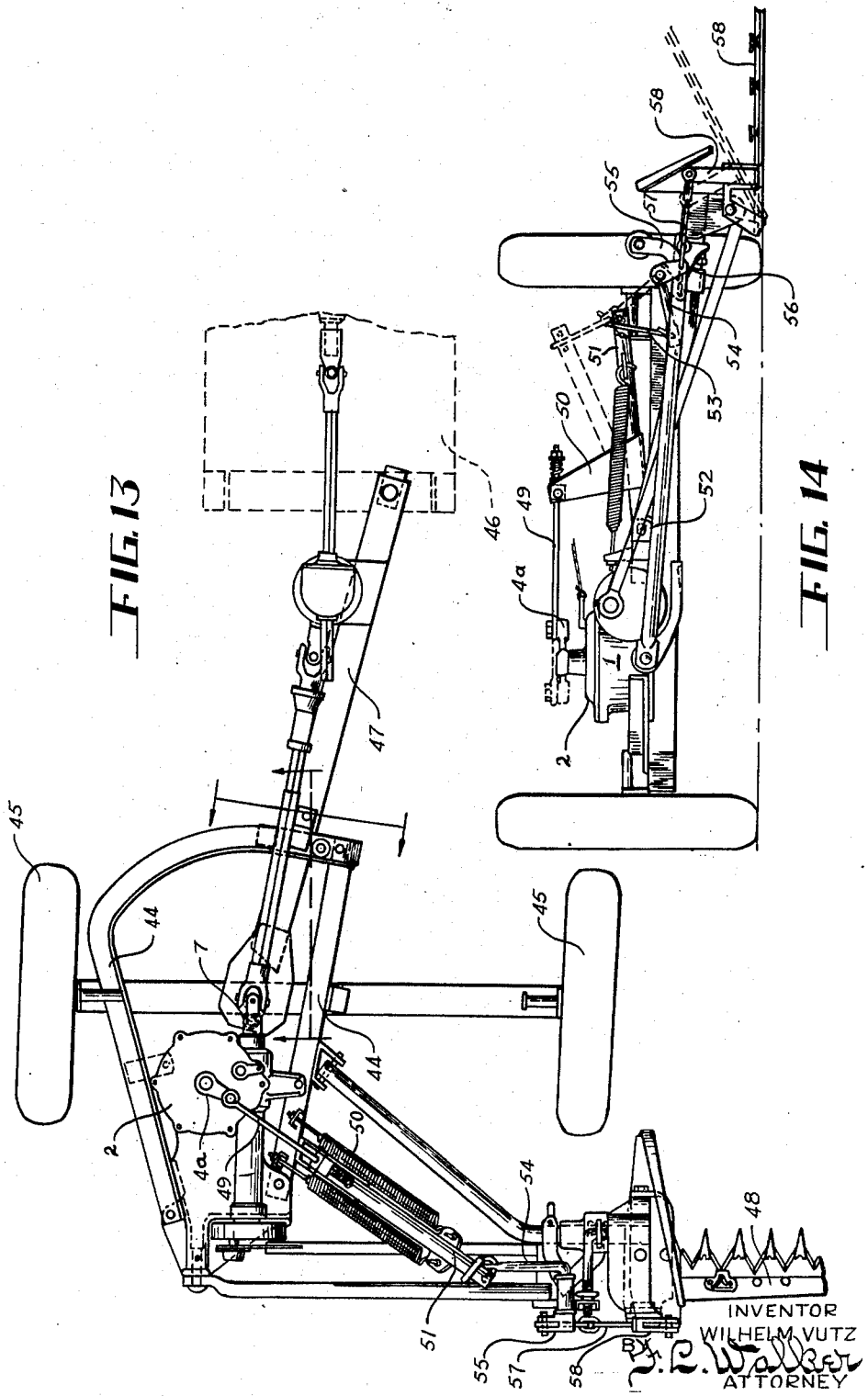
INVENTOR
WILHELM VUTZ
BY J.C. Walker
ATTORNEY Patented Sept. 26, 1950

2,523,890

UNITED STATES PATENT OFFICE 2,523,890

POWER LIFT MECHANISM FOR IMPLEMENTS

Wilhelm Vutz, Coldwater, Ohio, assignor, by mesne assignments, to Avco Manufacturing Corporation, a corporation of Delaware Application February 12, 1946, Serial No. 647,030

12 Claims. (Cl. 192—26)

This invention pertains to power transmission units, and more particularly to a cyclic operating mechanism for optionally actuating a connected device successively through a predetermined range of alternating motion and arresting it at the termination of each alternation.

While for illustrative purpose, but with no intent to unduly limit the scope or application of the invention, it is herein illustrated and described as applied to agricultural apparatus for raising and lowering the cutter bar of a mowing machine, it is to be understood that it is not limited thereto, but may be variously utilized for power operated adjustment of the gathering devices of corn pickers, loading and conveyor apparatus, dump trucks, gang planks for vessels, charging and discharging concrete mixers, opening and closing swinging or sliding doors, and analogous operations.

There is contemplated a continuously rotating power driving element with which a driven member is temporarily connected by a manually tripped coupling device for a predetermined cycle of operation, by which the actuated mechanism is operated through a prescribed range of movement, at the end of which it is automatically arrested and held until the mechanism is again tripped, whereupon it is actuated through a succeeding cycle during which the actuated mechanism is returned through its previous range of movement to its original position.

The object of the invention is to improve the construction as well as the means and mode of operation of such power transmission units, whereby they may not only be economically manufactured and operated, but will be more efficient in use, automatic in operation, uniform in action, have relatively few operating parts, and be unlikely to get out of repair.

A further object of the invention is to provide a power operated unit of more or less universal application for effecting alternation of an actuated mechanism through successive periods of operation and arresting the mechanism at the end of each operative period.

A further object of the invention is to provide a power transmission unit having the advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein are shown the preferred but obviously not necessarily the only form of embodiment of the invention, Fig. 1 is a top plan view of an assembled transmission unit embodying the invention and disclosing the relation of the parts when in one of alternative rest positions.

Figs. 5 to 12 are detail views of individual elements, wherein Figs. 5 and 6 are respectively a top plan view of the rotary driving plate and a vertical sectional view on line 6—6 of Fig. 5.

Fig. 7 is a plan view of the clutch throwout plate.

Fig. 8 is a bottom plan view of the adjustable crank assembly, while Fig. 9 is a vertical sectional view thereof on line 9—9 of Fig. 8.

Fig. 10 is a plan view of the adjustable back stop.

Figs. 11 and 12 are respectively a top plan view and a side elevation of the driving pawl.

Fig. 13 is a top plan view and Fig. 14 a rear elevation of an agricultural mower upon which the present unit is shown installed and operatively connected for raising and lowering the vertically swinging lateral extending cutter bar.

Figs. 15 and 16 illustrate respectively a top plan view and a vertical sectional view of a frictional safety stop means arresting the rotation of the driven parts at the limit of their range of movement.

Like parts are indicated by similar characters of reference throughout the several views.

While the present transmission unit is shown and described in its relation to an agricultural mower mechanism, it is to be understood that it is applicable to a wide range of other devices involving two stage cycles of operation. It is especially applicable to those installations wherein an operated structure is to be raised and lowered, moved in and out, or over and back, and temporarily arrested at the completion of each stage until the succeeding stage of operation is initiated, either manually, mechanically or electrically by a suitable trip device.

Figure 2:
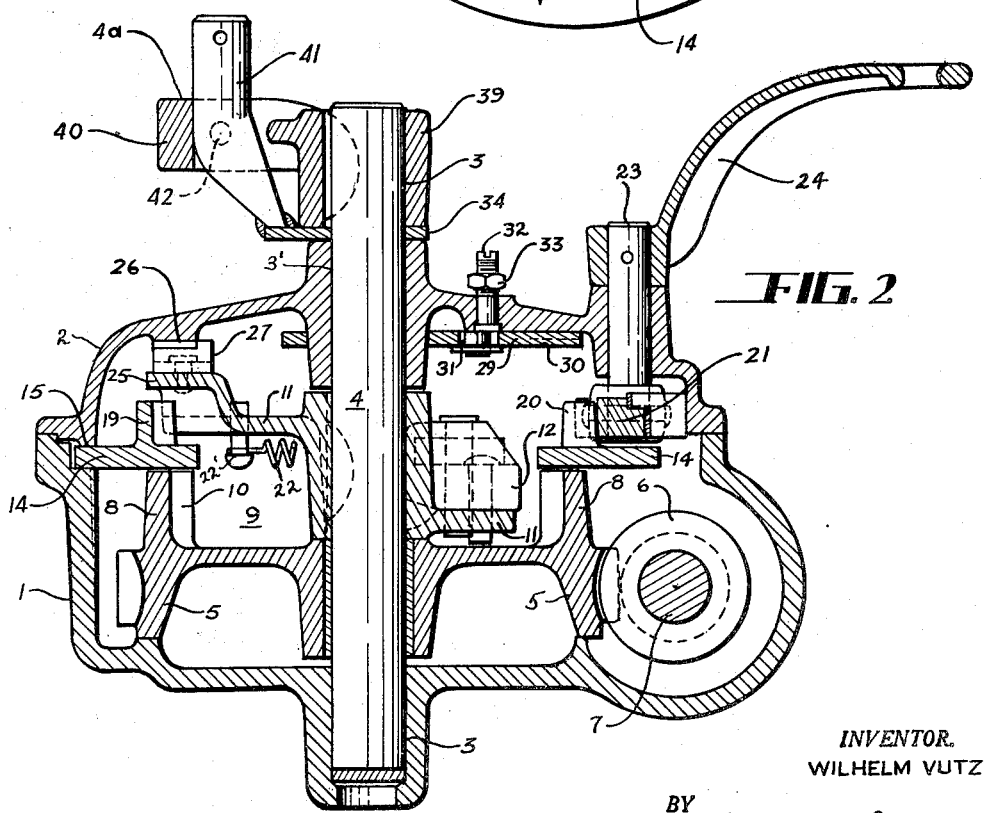
Fig. 2 is a vertical sectional view of the transmission unit assembly.

As shown in Fig. 2, the present power transmission mechanism is housed in a cylindrical casing which is separable into a lower section 1 and an upper or cover section 2. Journaled therein in concentric aligned bearings 3—3' is a revoluble driven power shaft 4 connected to the operated structure. Loosely journaled on the power shaft 4 is a worm wheel 5, with which meshes a worm gear 6 on a drive shaft 7. The drive shaft 7 is preferably but not necessarily in continuous rotation. In the illustrated application, Figs. 13 and 14, the shaft 7 is the motor driven power shaft of the mower mechanism, with which the instant transmission mechanism is intermittently coupled, as hereinafter described.

The worm wheel 5 is formed with an upstanding marginal flange 8 forming therewithin a concentric recess or chamber 9, the interior wall of which is provided with a succession of arcuate bays or indentations 10, forming an undulating or crenate internal contour. Secured upon the shaft 4 for unison rotation within the recess 9 of the driven worm wheel 5 is a driving plate 11, shown in detail in Figs. 5 and 6. Pivotally mounted on the driving plate 11 is an oscillatory pawl arm 12, the free end of which is movable into and out of thrust engagement within any one of the bays or indentations 10 of the gear wheel flange 8 by oscillation of the pawl arm. The pawl arm 12 is urged into gear engaging relation by a helical expansion spring 13. When so engaged the pawl arm 12 functions as a clutch to transmit unison rotary motion from the worm gear wheel 5 to the driving plate 11 and driven shaft 4.

To control the engagement and disengagement of the pawl arm 12, a circular floating control plate 14, shown in Fig. 7, is loosely supported upon the upper margin of the flange 8 of the worm gear wheel 5. The peripheral margin of the control plate 14 is confined for free rotary motion within a rabbet 15 intermediate the upper and lower housing sections 1 and 2. Such peripheral engagement of the circular control plate 14 with the housing or casing 1—2, centers the plate and prevents lateral displacement, without, however, restricting oscillatory motion thereof in the plane of the plate.

The control plate 14 is interiorly open at 16. The inner margin 17 of the plate 14 is concentric throughout its greater extent and merges into an internal cam portion a—a' (Fig. 7), which terminates at its deeper end in an arcuate recess 17'. The pawl arm 12 carries at its free end a roller 18, which rides upon the interior cam shaped margin of the control plate opening 16. During inoperative periods of the apparatus the pawl arm 12 is held in retracted relation against the tension of its spring 13 by engagement of the roller 18 upon a higher portion of the cam shaped margin of the control plate opening at approximately the point a'. Consequently, the drive plate 11 and driven shaft 4 remain at rest, while the power shaft 7 and worm 6 continue to idly rotate the worm gear wheel 5. By shifting the control plate 14 rotatively to move the cam area a—a' relative to the pawl arm roller 18, the pawl arm 12 is allowed to move outwardly into engagement within a bay 10 of the rotating gear wheel 5, under influence of its spring 13. The control plate 14 is provided with a perpendicular flange 19, which is interrupted at one or more peripherally spaced points to form stop shoulders 20 for intermittent engagement of a hook shaped dog 21 under influence of its spring 21'. When the arresting hook shaped dog 21 is disengaged, the control plate is actuated through a partial rotation by a helical retracting spring 22, one end of which is connected at 22' with the driving plate 11, and the opposite end of which is attached at 22'' with the control plate 14. While the apparatus is at rest the control plate 14 is held retracted by the hook shaped dog 21 against the tension of the spring 22, and so holds the pawl arm 12 retracted out of driving engagement with the gear wheel 5. The oscillatory arresting dog 21 is mounted on a vertical rock shaft 23, having at its upper end a trip lever 24 to which is preferably connected a pull cord extending within easy reach of the operator.

The manual disengagement of the arresting dog 21 from the shoulder 20 of the control plate 14 permits the latter to shift rotatively a short distance under influence of its actuating spring 22 to bring a deeper portion a' of its cam margin opposite the pawl arm roller 18, thereby enabling the pawl arm 12 to swing outwardly under influence of its spring 13 into engagement in a passing bay 10 of the rotating gear 5. Such partial independent rotation of the control plate 14 is arrested by engagement of the pawl arm roller 18 within the terminal recess or pocket 17'' which thereafter causes the control plate to continue its rotation in unison with the gear 5, the driving plate 11 and the shaft 4, incident to the thrust pressure of the rotating gear 5 upon the extended pawl arm 12. The driven shaft is thus caused to rotate through a full rotation or a partial rotation of predetermined extent, until automatically disconnected at the end of a predetermined cycle of operation. Such automatic disconnection occurs when, in its operative rotation, the succeeding interruption of the control plate flange 19 is brought opposite the spring pressed hook shaped dog 21 which in the meantime has been riding upon the exterior periphery of the control plate flange 19, whereupon the spring pressed dog 21 springs into arresting engagement with a shoulder 20 of the control plate flange 19 to arrest the plate 14, while the driving plate 11, shaft 4 and driving gear 5 continue to rotate a short distance, during which the pawl arm roller 18 rides up the cam surface a'—a of the plate. Such relative motion presses the pawl arm 12 inwardly against the tension of its spring 13 until it is entirely disengaged from the drive gear 5, whereupon the driving plate 11 and shaft 4 come to rest with the throw crank 4a on the upper end of the shaft in a predetermined position. The extent of rotary motion, whether a full turn or partial rotation, transmitted to the shaft 4 is dependent upon the number and relative spacing of the interruptions of the control plate flange 19 and the relative positions of the stop shoulders 20 engageable by the spring pressed dog 21.

As illustrated in the drawings, the flange interruptions and stop shoulders 20 are located in approximately but not exactly opposite relation, in which event the partial rotations are nearly equal, the first operation serving to turn the shaft 4 and rock arm or throw crank 4a carried thereby to a reverse position, and the succeeding operation returning the shaft, driving plate, control plate and throw crank to their original positions. Such unequalized partial rotations of the illustrated apparatus enables the operated mechanism actuated by the throw crank to be arrested beyond a dead center relation when moved in one direction, as, for example, to arrest the cutter bar of a mowing machine, not in its most elevated position attained during its movement, but at a slightly lower position with throw crank 4a correspondingly arrested slightly beyond its dead center position. An advantage of using such an arrested position will be described more fully hereinafter.

By differently spacing the flange interruptions and stop shoulders 20, the partial rotations of the shaft 4 and throw crank carried thereby may be correspondingly proportioned. For example, the shaft and throw crank may be caused to move one-fourth, three-eighths, or three-fourths of a complete rotation during the first operation and complete the remainder of a full rotation upon its succeeding operation.

The relative oscillation of the shaft 4, the driving plate 11 and control plate 14 under influence of the spring 22 or by gravity of the elevated cutter bar of a mowing machine acting on the throw crank, is positively limited in either direction.

Figure 1:
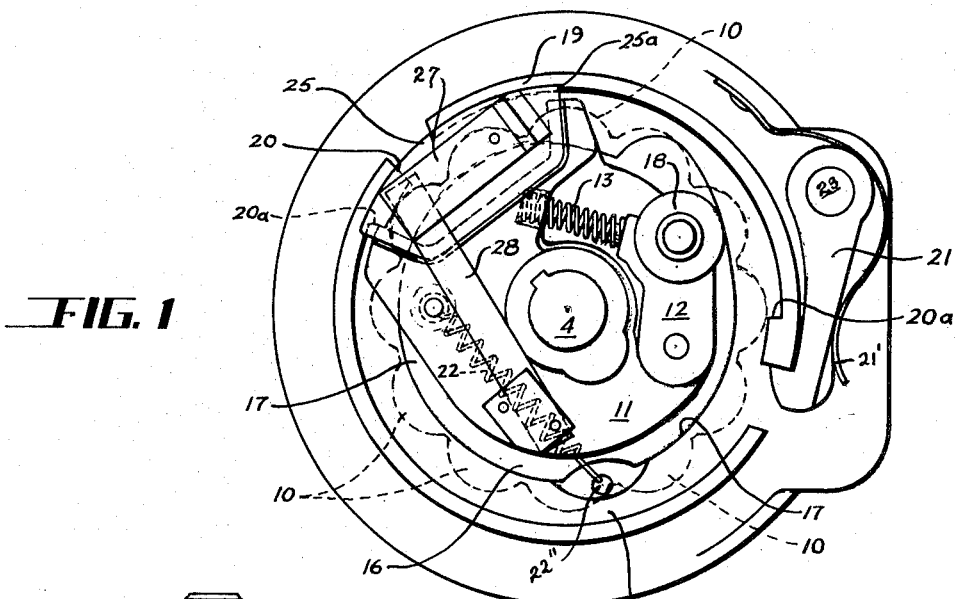
Figure 3:
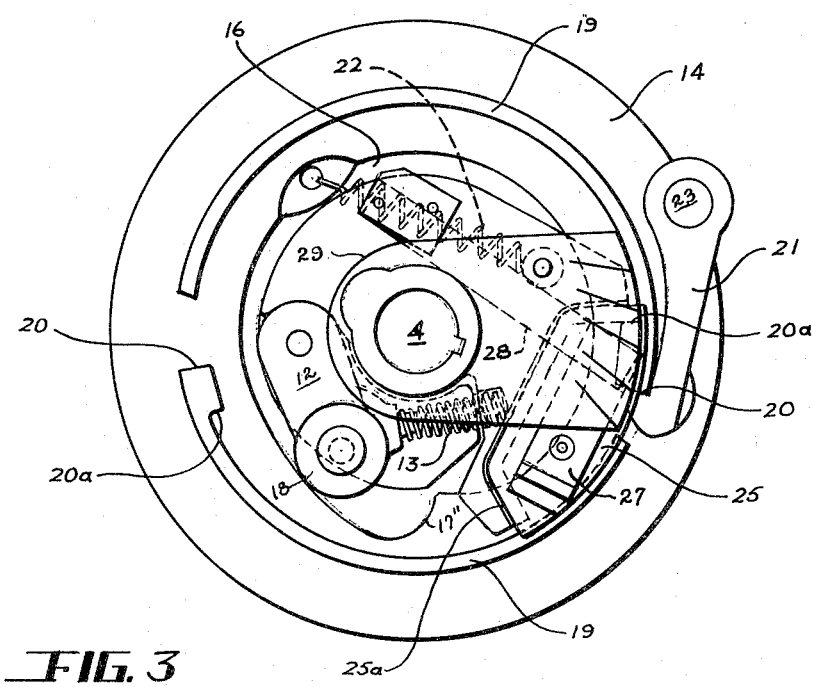
Fig. 3 is a plan view similar to Fig. 1, showing the relative positions of the parts when in the other of alternative positions of rest.
Figure 4:
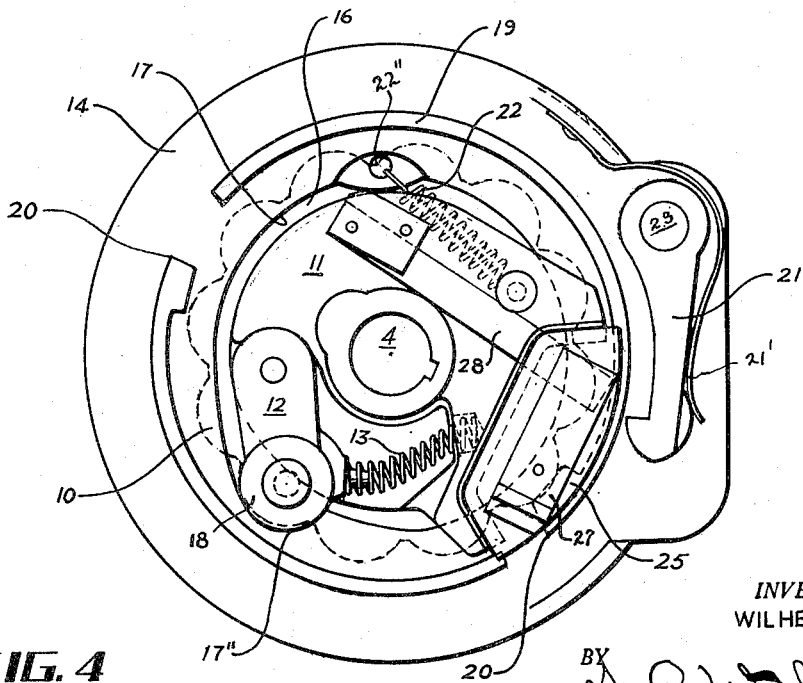
Fig. 4 is a like plan view illustrating the parts at an intermediate stage during their movement from the Fig. 3 to Fig. 1 position.

The driving plate 11 is formed with an elevated segmental portion 25 which overlies an interruption of the flange 19 of the control plate, one side of which interruption comprises the shoulder 20 for engagement of the hook shaped dog 21. Such shoulder portion 20 is projected inwardly of the flange 19 to form a shoulder or offset 20a at the inner side of the flange. The peripheral margin of the elevated segmental portion 25 of the driving plate 11 extends, with slight clearance, radially over the top of the control plate flange 19. The elevated segment 25 of the driving plate is positioned to straddle the interruption of the control plate flange 19 with its upwardly inclined side walls 25a traveling inside the peripheral flange 19 and making limiting contact with the inwardly projected offset 20a of the abutment or dog engaging shoulder 20 upon relative movement of the driving plate and control plate 14 in either direction. This engagement arrests the past center movement, such as urged by the gravity load of the elevated cutter bar, of the driving plate 11 and shaft 4 relative to the control plate, which latter is then being held by the dog 21. On the under side of the housing or casing cover 2 is a segmental series of integral ratchet teeth or projections 26 engageable by loosely mounted spring biased pawl 27 on top of the elevated segment 25 of the driving plate 11. In Figs. 1, 3 and 4 the pawl is shown by solid lines, and a flat spring 28 connected to the driving plate 11 holds the engaging end of the pawl raised. This is a safety feature. In the event that the driving pawl arm 12 may not properly seat within, or be displaced from the bay 10 of the drive gear 5, and the weight of the operated cutter bar or other controlled member tend to move the crank and shaft, the safety pawl will automatically prevent retrograde motion thereof.

The safety pawl 27 has another function in cooperation with the locking dog 21, to wit, to maintain the operated position of the parts and prevent tremor or vibration. The dog 21 positively holds the control plate and driving plate locked against motion in one direction under tension of the spring 22, while the safety pawl 27 by its engagement with the housing teeth 26 prevents chatter or vibration in the opposite direction. The safety pawl 27 is thus opposed to the dog 21, and conjointly they hold the movable parts in a definite operated position. For controlling the adjustable parts in their alternate operated position, there is provided a segmental plate 29 journaled on the hub of the upper casing member 2 for limited oscillatory motion, to take up lost motion and enable accurate adjustment. The segmental plate 29 has upon its under side a series of ratchet teeth 30 for engagement of the safety pawl 27 before mentioned in a manner analogous to its engagement with the series of teeth 26 integral with the casing top 2. The segmental plate 29 has therein a small slot 31 in which engages an eccentric end of a revoluble stud or pin 32 screw threaded in the top of the casing 1 and retained in its adjusted position by a lock nut 33. By partial rotation of the stud 32 the segmental plate 29 may be minutely oscillated to and fro to take up lost motion and cause accurate engagement of the safety pawl 27 with the teeth 30.

Figure 16:
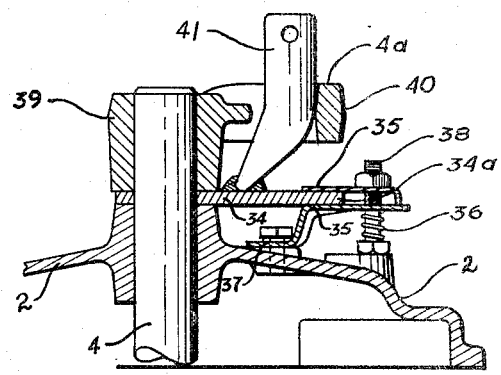
Figures 8, 15:
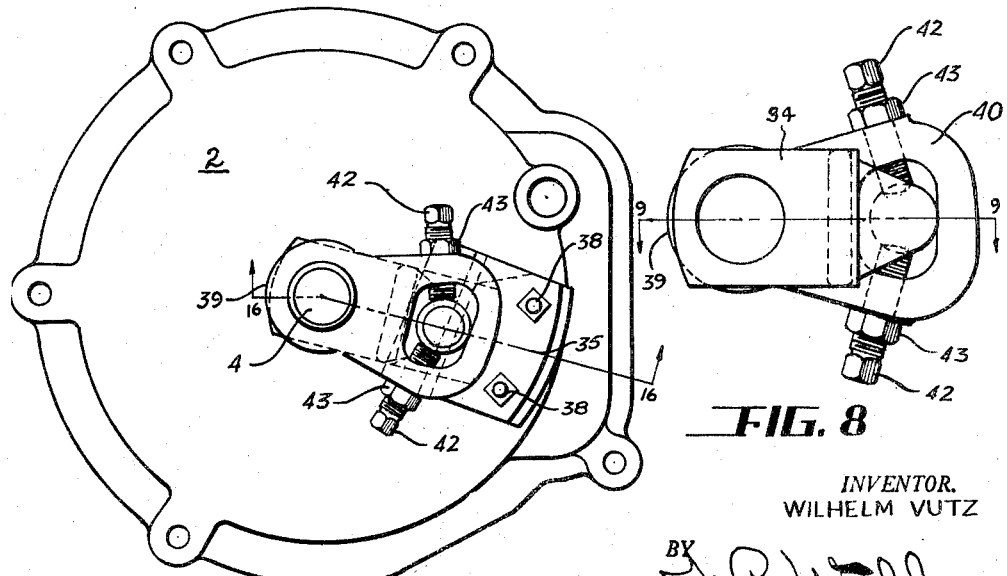

As an alternative construction, there is shown in Figs. 15 and 16 a frictional type detent, wherein a radial extension 34a of the plate 34 revoluble in unison with the shaft 4 and preferably forming a part of the throw crank 4a, is releasably gripped. At the limit of one partial rotation of the shaft and crank, the radial extension 34a of the plate 34 enters between a pair of spring tensioned clamp plates 35 subject to influence of a pressure spring 36. The lowermost clamp plate 35 is mounted at 37 upon the top 2 of the casing or housing, while the upper plate 35 is carried by a stud 38 projecting from the same housing or casing top 2. The plates 35 are relatively movable to sufficient degree to clamp the rotary plate extension 34a with a braking effect when it enters therebetween as the traveling parts approach the limit of their range of travel. The gripping or clamping action is under sufficient tension to resist lost motion and tremor or chatter of the movable parts after they have come to rest.

In the application or embodiments shown in Figs. 13 and 14, the integral ratchet teeth upon the upper casing portion 2 function when the movable parts are subject to gravity influence of the load, as for instance when the cutter bar of a mowing machine therein illustrated is being held in elevated position and the parts are under considerable strain. The segmental plate 34a is employed for preventing idle motion when the cutter bar is down and the strain or tension relaxed. The range of movement of the operated parts is preferably such that upon operation of the load against gravity, as when the cutter bar is elevated, the throw crank 4a is actuated to a point slightly beyond its dead center.

When locking dog 21 is rotated and disengaged from control plate 14 to lower the cutter bar from its elevated position, the gravity load, acting on the throw crank in its past dead center position, rotates shaft 4 and consequently driving plate 11, which in turn imparts rotation to the control plate 14 through spring 22. The cutter bar comes to rest in its horizontal position, throw crank 4a and the other elements of the mowing machine then being in relative positions as shown in Figure 13.

The past dead center arrested position of throw crank 4a, when the cutter bar is in its elevated inoperative position, aids in a ready descent of the cutter bar under gravity after the locking dog 21 is tripped and, furthermore, prevents the possibility of the device being balanced in a dead center position. To this end the crank 4a is slightly adjustable relative to shaft 4.

Figure 9:
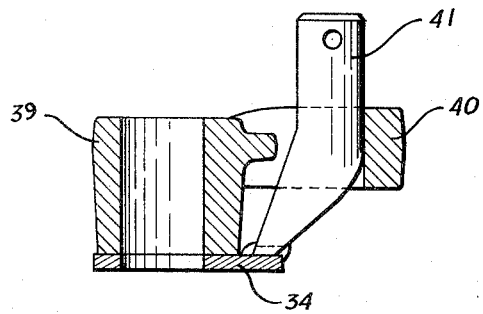
Figure 11:
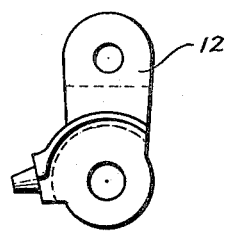
Figure 12:
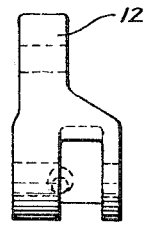
Figure 10:
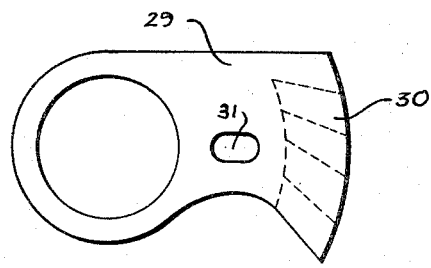

As illustrated in Figs. 8 and 9, the throw crank 4a fixedly mounted on the top of the shaft 4 comprises a hub 39 from which projects an integral loop or eye 40. The crank pin 41 is fixedly attached to the plate 34 which is journaled upon the shaft 4 beneath the hub 39 for limited oscillatory adjustment. Extending through the opposite sides of the loop or eye 40 are two adjustable screw threaded studs 42, which bear in converging directions upon the crank pin 41. By slightly retracting one of the thrust studs 42 and tightening the other, the plate 34 and with it the crank pin 41 may be oscillated in one direction or the other to vary the radial position of the crank pin 41 about the axis of the shaft 4, and correspondingly vary the throw of the crank. The thrust studs 42 are locked in their adjusted relation to maintain the position of the crank by lock nuts 43.

For illustrative purposes, but with no intent to unduly limit or restrict the application of the invention, it is shown in Figs. 13 and 14 as embodied in a mowing machine for elevating and lowering the out rider cutter bar thereof. Briefly described, such mower mechanism comprises a chassis 44, mounted on carrying wheels 45, and attached to a tractor 46 by a draft tongue 47. Power is derived from the tractor unit 46 for continuously rotating the driving shaft 7 for the worm 6. Extending laterally from the chassis is a cutter bar 48 mounted for retractive swinging motion from its horizontal operative position of Fig. 14 to an elevated inoperative position by the action of the hereinbefore described motion transmitting mechanism. In Fig. 13, the housing or casing 1—2 enclosing the power transmission mechanism forming the subject matter of the instant application is shown mounted on the chassis slightly to the rear (left) of the axes of the carrying wheels. Mounted on the shaft 4 protruding from the top above the casing top 2 is shown the throw crank 4a which is connected with the cutter bar 48 through a system of linkage, including a pitman or reciprocatory link 49 connected to an arm 50 carried by an oscillatory lever 51 pivoted at 52, the extremity of which is connected by a link 53 with one arm 54 of a bell crank lever 55. The other arm 56 of the bell crank is connected by a link 57 with an arm 58 projecting from the cutter bar 48. The retraction of the throw crank 4a acting through the linkage system mentioned, lifts the cutter bar 48 from its horizontal position shown in Fig. 14 to an elevated inoperative position. The particular mower mechanism and arrangement illustrated in Figs. 13 and 14 do not form any part, per se, of the present invention, but is set forth and claimed in a copending application for Letters Patent Serial No. 488,482, now U. S. Patent 2,463,726, to which cross reference is made.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A power transmission unit, including a driving wheel having therein an annular series of recesses, a driven shaft upon which the driving wheel is journaled, an arm fixed upon the shaft, a driving pawl pivoted to the arm and engageable with any one of the recesses of the driving wheel, a spring urging the pawl into engagement with the driving wheel, a rotary cam controlling the motion of the pawl into and out of engagement with the driving wheel, a spring interconnecting the cam with the arm carried by the driven shaft for unison rotation, an arrester manually operable to retard the rotation of the cam against the tension of its spring, the construction and arrangement being such that upon retardation of the cam the continuing motion of the driving wheel and pawl relative thereto will effect camming engagement of the cam and pawl to move the latter out of engagement with the driving wheel against the tension of the pawl spring, thereby disengaging the driving wheel and driven shaft, and the subsequent release of the cam for limited motion thereof under influence of its spring connected therewith and tensioned by the differential motion of the driven shaft relative to the retarded cam, the cam will release the pawl for motion under influence of its spring into reengagement with the driving wheel to reestablish unison rotation of the driving wheel and the driven shaft.

2. A power transmission unit, including driving and driven members, a pawl traveling with the driven member, two series of ratchet teeth engaged thereby to prevent retrograde motion of the driven member, one set of which is adjustable relative to the other set of teeth, and means for collectively adjusting one set of said ratchet teeth to take up lost motion.

3. A power transmission unit, including driving and driven members, a pawl traveling with the driven member, an oscillatory plate mounted concentrically with the driven member, a series of ratchet teeth thereon engaged by the pawl to prevent retrograde movement of the driven member, and means for adjusting the plate through minute increments of movement to compensate for lost motion between the pawl and ratchet teeth engaged thereby.

4. For use in a mowing machine of the type wherein an outrigger type of cutter bar mechanism is mounted for to and fro motion from operative to inoperative position and vice versa, a power operated elevating and lowering mechanism, automatic means for arresting the power operated mechanism at the limits of succeeding operations, means for temporarily locking the operated mechanism at the opposite limits of its range of movement, one of said means being frictional in character and impositively restraining fluctuations of the power elevating and lowering mechanism, and means for initiating operation of the said power operated mechanism at the will of the operator.

5. A power transmission unit, including a rotary crank, motion transmitting means for moving a driven member through a predetermined range of movement by a partial rotation of the rotary crank, at the limit of which the driven member is temporarily held in its operated position by movement of the rotary crank beyond its dead center position, a member rotatable in unison with the crank, and frictional detent means with which said rotatable member is engageable when the rotary crank is in an alternate position of adjustment wherein the driven member is positioned at the opposite limit of its range of movement to retard lost motion fluctuations of the driven member.

6. A power transmission unit wherein a rotary power crank is operative to move a driven member through a predetermined range of movement and temporarily retain it in its operated position by movement of the crank beyond its dead center position, including a frictional brake device automatically operative upon rotation of the crank to move the driven member to the opposite limit of its range of motion for impositively restraining fluctuations of movement of the rotary crank.

7. A power transmission unit wherein a rotary power crank is operative to move a driven member through alternate movements of predetermined range, at the limit of one of which movements the driven member is temporarily held by movement of the rotary crank beyond its dead center position, including a member movable in unison with the rotary crank, and clamp means automatically engaging said member when the driven member is at the opposite limit of its range of movement to minimize fluctuations of the rotary crank and the driven member.

8. A transmission unit wherein a driving member is effective to actuate a driven member to and fro through alternate ranges of travel, means for temporarily maintaining the driven member at the opposite limits of its travel movement, including a pair of spring pressed plates and a third member movable in unison with the driving and driven members into and out of a position intermediate the spring pressed plates to retard movement of the driving and driven members.

9. In combination in a power transmission mechanism a continuously rotating driving wheel formed to define a plurality of recesses in its periphery, a driven shaft cooperatively disposed relative to said driving wheel, a pawl pivotally secured to said driven shaft, means for constantly urging said pawl into engagement with the recesses of said driving wheel, a rotary cam surrounding said driven shaft adapted for rotation therewith and for cooperation with said pawl, and means to produce relative rotation between said rotary cam and said driven shaft to permit engagement of said pawl with the recesses on relative motion in one direction and to positively disengage the pawl from the recesses on relative motion in the opposite direction.

10. A power transmission unit comprising, a driving wheel having a clutch surface on its internal periphery, a driven shaft cooperatively disposed relative to said driving wheel, a coupler member movably secured to said driven shaft and adapted for engagement with the clutch surface of said driving wheel, means urging said coupler member into engagement with the clutch surface at all times, a control cam adapted for corresponding movement with said driven shaft and adapted for co-action with said coupler member, and means to produce relative motion between said control cam and said driven shaft to permit engagement of said coupler member with the clutch surface on relative motion in one direction and to positivily disengage the coupler member from the clutch surface on relative motion in the opposite direction.

11. Apparatus as defined in claim 10 and, in addition, means for preventing reverse rotation of said driven shaft when said coupler member is disengaged from the clutch surface of said driving wheel.

12. A power transmission unit comprising a driving wheel formed to define an annular series of recesses on its internal periphery, a driven shaft coaxial with said driving wheel, a pawl pivotally secured to said driven shaft for engagement with the recesses of said driving wheel, resilient means urging said pawl into engagement with the recesses at all times, a revoluble annular cam coaxial with said driven shaft and adapted for cooperation with said pawl, a spring connected to said annular cam and said driven shaft to produce relative rotation therebetween in one direction to permit said pawl to engage the recesses of said driving wheel, manually operated means to produce relative rotation between said driven shaft and annular cam in the opposite direction to positively disengage said pawl from the recesses, and means to positively prevent any movement of said driven shaft when said pawl is disengaged from said driving wheel.

WILHELM VUTZ.

REFERENCES CITED

The following references are of record in the file of this patent:

UNITED STATES PATENTS

| Number | Name | Date |
| --- | --- | --- |
| 998,003 | Howe | July 18, 1911 |
| 1,166,457 | Higgins | Jan. 4, 1916 |
| 1,228,834 | Schoenky | June 5, 1917 |
| 1,980,757 | Janda | Nov. 13, 1934 |
| 2,292,962 | Mott | Aug. 11, 1942 |
| 2,304,421 | Rogers | Dec. 8, 1942 |
| 2,341,753 | Zwald | Feb. 15, 1944 |

FOREIGN PATENTS

| Number | Country | Date |
| --- | --- | --- |
| 713,819 | France | Nov. 3, 1931 |